June 20, 1967 R. D. FORESTER 3,326,320
SEISMIC SURVEYING WITH AN IMPULSE PATTERN CONSISTING
OF POSITIVE AND NEGATIVE IMPULSES
Filed Dec. 31, 1964 2 Sheets-Sheet 1

ROBERT D. FORESTER
INVENTOR.

BY *Paul F Hawley*

ATTORNEY.

ROBERT D. FORESTER
INVENTOR.

BY *Paul F Hawley*

ATTORNEY.

United States Patent Office 3,326,320
Patented June 20, 1967

3,326,320
SEISMIC SURVEYING WITH AN IMPULSE PATTERN CONSISTING OF POSITIVE AND NEGATIVE IMPULSES
Robert D. Forester, Tulsa, Okla., assignor to Pan American Petroleum Corporation, Tulsa, Okla., a corporation of Delaware
Filed Dec. 31, 1964, Ser. No. 422,666
4 Claims. (Cl. 181—.5)

This invention pertains to the field of seismic geophysical exploration, although with appropriate modifications, it may be applied more generally as a distance measuring system for other applications. More particularly it relates to a particular improvement in method and apparatus involving the use of a new type of source of waves for depth sounding and analogous purposes.

It is, therefore, an object of this invention to provide a new method and apparatus for distance determination particularly applicable to geophysical seismic prospecting. Basically involved is a novel arrangement for a source of multiple seismic waves which permits distinct improvement in the process in which a signal proportional to the source excitation is crosscorrelated with received waves at a distant point.

It is well-known that in seismic prospecting a source of seismic waves is applied to the earth near the surface. Seismic waves are refracted and reflected from the various strata encountered and are ultimately received at a plurality of seismometers or geophones. These may be located at or near the surface of the ground in various horizontal or vertical arrays, and are connected individually or in groups to amplifiers and recording equipment.

One of the major problems in seismic prospecting is the fact that there is a tremendous amount of unwanted seismic disturbance at the geophone array. These waves are generically referred to as "noise" and include waves generated at the source and waves generated at other locations, for example, due to ground or air traffic, wind effects on vegetation, and the like. Selective recording of a band of frequencies which is less than the total frequency spectrum of the waves impinging on the geophones has been used as one means of minimizing this noise, which may or may not be effective, depending upon the region to be prospected. In the past few years another method for improving the signal-to-noise ratio has involved correlation techniques. In this procedure, a mathematical processing technique is carried out on the received waves. This process has become well-known so only brief references need be made to it. Basically, the instantaneous amplitude of the received waves is multiplied point by point by the corresponding amplitude of a signal representing the actual or idealized seismic source wave, or waves, and the resultant is summed over the duration T of the source signal. If the source pattern be designated as a function of time $f_1(t)$, and the received wave be similarly designated as a function of time $f_2(t)$, the crosscorrelation function $f_3(T)$ is given by the integral expression $$f_3(T) \int_{t=0}^{t=T} f_1(t) f_2(t) \, dt \qquad (1)$$

It is not sufficient to obtain the crosscorrelation of the two functions for only one particular time relationship between them. Locating the received signal corresponding to the sent signal requires that the crosscorrelation be carried out a large number of times as the one function is shifted in time relative to the other. Mathematically one shifts the function [for example, $f_2(t)$] relative to the other function by various finite time differences $\tau$.

$$f_3(T, \tau) = \int_{t=0}^{t=T} f_1(t) f_2(t+\tau) \, dt \qquad (2)$$

$\tau$ may have positive or negative values. The value of $\tau$ at which there is a maximum for the function $f_3(T,\tau)$ corresponds to a location of the initiating seismic wave in the received signals. Obviously, if there are more than one received wave like the sent wave (i.e., where there are reflections from a plurality of different strata) there will be corresponding maxima at each such reflected wave.

The chief benefit to the crosscorrelation technique is that any random occurring noise tends to average out in the multiplication and integration steps and, hence, will be minimized compared to the signal. Minimization of noise depends considerably upon the total time involved in the initiating signal (the time T) and in the complexity (or total frequency spectrum) of the input signal. Put another way, one increases the finding ability of the crosscorrelation technique in the presence of random noise by increasing the total time during which signal is put into the ground and increasing the total frequency spectrum of the input signal. Accordingly, it is desirable to employ input signals existing over the period of the order of 2 to 6 seconds or perhaps more, rather than using a single impulse such as a single charge of dynamite. It is also desirable to use a complex input wave form rather than, for example, a section of a sine wave. Of course, this means that the increased frequency content should be both of the applied wave and of the received wave. The earth itself acts somewhat as a filter and, therefore, it is useless to apply frequency components to the earth which will not be transmitted to the receiving geophones.

One type of wavelet of rich frequency content is an impulse, that is a wave of substantial amplitude but of relatively short time duration, for example, of the order of less than one to perhaps five milliseconds or so. Waves of this type may be initiated in the earth by various types of explosive sources. However, in experiments in which I have participated, it has been determined that the frequency content of the initiated waves in the earth may be high for small charges of explosives (for example, of the order of ⅛ pound of dynamite or less) but this frequency content decreases considerably and undesirably as the amplitude of the explosion increases. Thus, for example, when detonating a pound of dynamite at the same location as that at which $\frac{1}{16}$ pound of a dynamite had previously been shot, the initial waves propagating a wave from the explosive through the top layers of the earth will be found to have much narrower a band of frequencies in the waves than for the $\frac{1}{16}$-pound shot. It is also found that the energy present in the initial seismic waves generated increases directly with something of the order of the weight of explosive. From this, it is very apparent that one would like to obtain sufficient initial seismic energy when using the crosscorrelation system for adequate penetration to the deepest reflecting horizons to be investigated while maintaining a wide band of frequency components in this energy to produce a sharper autocorrelation pattern, as described later. An impulse type source inherently will have wider frequency components than an equivalent steady state sine vibration, or than the varying frequency quasi sine wave signals described in, for example, the Doty et al. Patent No. 2,688,124.

I have found another factor to be of definite importance. When a single impulse is correlated with another single impulse, the resultant correlogram will possess only one peak. However, if the signal $f_1(t)$ contains, for example, two impulses of approximately equal amplitude and the signal $f_2(t)$ similarly continues two impulses of approximately equal amplitude (the time spacing between impulses being the same in both cases), the crosscorrelation function as defined by Equation 2 will have one peak of maximum amplitude and two other peaks of half that amplitude, separated in time by the time spacing between the two impulses. Thus when crosscorrelating such a seismic input wave with received waves, at the time location of each reflection there would not be one single peak but the equivalent of a central peak with two side lobes.

Mathematical investigation of the function $f_3(T,\tau)$ given by Equation 2 indicates that in general the crosscorrelation pattern from a plurality of initiating impulses and an equivalent plurality of received impulses will be one maximum on the correlogram with a number of side lobes of varying amplitude and time spacing, depending upon the complexity of the input signal. In general, as this complexity increases it is found that the side lobes may either increase or decrease but generally will be prominent and hence tend to produce undesirable maxima on the resultant correlograms.

I have found it possible to use a special type of input signal for crosscorrelation seismic prospecting or its equivalent, using a plurality of discrete impulses applied in such a way that the crosscorrelation tends to produce only one significant maximum for each coincidence of the input pattern of waves with an output reflected signal. I employ a plurality of both positive and negative impulses of increasing time of application which generally decrease in peak amplitude (though this expression includes the situation where one or more impulses may be of greater amplitude), and apply autocorrelation to determine the best shape for this function. Autocorrelation is simply correlation of a function with itself. Thus, for example, if the impulse pattern of positive and negative impulses be designated as $f_4(t)$, the autocorrelation of this function would be $f_5(T,\tau)$ where $$f_5(T, \tau) = \int_{t=0}^{t=T} f_4(t)f_4(t+\tau)dt \qquad (3)$$

When the resultant autocorrelation function or correlogram of this set of positive and negative impulses is made, either by hand computation, computer techniques, or machine processing (such as by the system shown in French Patent 1,329,739) it will be found that there is a principal or maximum lobe to the function and usually a considerable number of side lobes. I then modify the time of application or the amplitude of the impulses in the pattern until the maximum lobe of the autocorrelation function of this pattern is at least 10, and preferably at least 20, times the amplitude of any side lobe of this autocorrelation function. While this procedure is somewhat arbitrary, it is possible to obtain satisfactory impulse patterns involving a correlogram as specified above rather rapidly after a little practice. In fact, I have produced such impulse patterns having over 200 impulses and produced correlograms in which the maximum lobe of the autocorrelation function was at least 50 times the amplitude of any side lobe.

When an initiating seismic wave applied to the earth is substantially directly proportional in amplitude and time to such an impulse pattern of positive and negative impulses, the received seismic signals will contain for each reflection a rather similar pattern of impulses, resulting from each reflection, and therefore the crosscorrelation of the received wave with this impulse pattern would produce substantially a single, relatively unmistakable peak or wavelet for the location of each reflected wave.

From a practical view, applying to the earth near its surface a force function which will produce an impulse pattern as defined in the last paragraph is of considerable difficulty, particularly because of the requirement that one applies the negative impulses as well as the positive impulses, i.e. that one creates rarefactions as well as compressional waves. While this can be accomplished by certain types of generating sources, it involves the necessity of applying a stead-state force to the earth greater than the maximum negative force to be applied, which is cumbersome for mobile equipment on land and quite difficult to accomplish when prospecting over water. However, I have found that the advantages of using this system of impulse pattern of positive and negative impulses can be carried out stepwise in a relatively simple manner. One first divides the plurality of positive and negative impulses into the positive impulses on the one hand and the negative impulses on the other, maintaining amplitudes and application times. One then applies in a localized zone near the surface of the earth a plurality of impulses directly proportional in time of application and in peak amplitudes to the corresponding characteristics of one of these two separated sets of impulses, either the positive or the negative. The corresponding seismic waves resulting from this seismic initiation are received at one or a plurality of points near the surface of the earth, amplified as desired, and recorded on a reproducible medium such as magnetic tape. After the completion of this operation, the same procedure is followed using the other set of impulses. For example, if the first procedure involved using the positive impulses from the original pattern of a plurality of positive and negative impulses, the second initiation would involve applying impulses directly proportional in time of application and in peak amplitude to the negative part of the impulse pattern. One does not apply negative impulses to the earth; one applies positive impulses, i.e., compressional type impulses. Two equivalent procedures may then be used with the two field records obtained from these steps. These steps are mathematically undistinguishable, though the procedural order is changed. In one of these, the signals present on both magnetic tapes are played back in the form of electrical signals, equally amplified, and the second one is reversed in phase and added to the first, to produce a third reproducibly recorded signal which represents the difference between the response of the same geophone or set of geophones to the positive part of the impulse pattern and to the negative part of the impulse pattern, and which, therefore, represents the response of the earth to the entire impulse pattern. This last recorded signal is then played back and correlated with the initiating impulse pattern of positive and negative impulses, to produce a visible indication which will be of the well-known type used by geophysicists in geophysical prospecting with minimization of noise and maximization of the reflected seismic waves, and with substantially no side lobe indications. The second equivalent procedure involves crosscorrelating the pattern of positive and negative impulses in the initiating wave with the signal played back from one of the two field tapes, and producing a reproducible record of this crosscorrelation. A similar crosscorrelation record is then made of the input impulse pattern with the waves recorded on the second field tape. The crosscorrelation function, or correlogram, obtained from the field tape involving the negative part of the initiating impulse pattern is subtracted from the other one by playing back both of the tapes simultaneously, reversing one in phase relative to the other, and producing a visible indication proportional at each instant to the instantaneous amplitude difference.

In both of these cases, it is apparent that the difference between the crosscorrelation of the pattern of positive and negative impulses has been made with the received waves reproducibly recorded in each of the two field tapes, using the same time scale for the pattern and for the field waves.

Since the procedure may seem somewhat complex, the invention is illustrated with the attached figures which form a part of the specification and are to be read therewith. In these figures.

Figure 1:
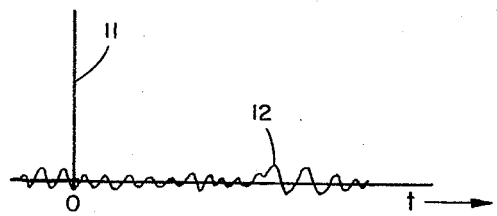
FIGURE 1 is a time graph of the application of a single impulse to a zone located near the surface of the earth.

Referring now to FIGURE 1, there is shown plotted the seismic waves present at a localized zone near the surface of the earth when a conventional charge of explosive is detonated at the time $t=0$, as shown on the graph, producing a sharp impulse or "spike" of energy at this time. It is to be noted that the localized zone around the shot point is not quiet from a seismic point of view. Both before and after the impulse 11 there are seismic waves 12 which are due to the sources of noise, as discussed above.

The seismic wave pattern shown in FIGURE 1 can be crosscorrelated with received seismic waves, but at only slight improvement in the signal-to-noise ratio over the conventional type of prospecting. If correlation is to be employed, an improved signal-to-noise ratio will be obtained by using an increase in the number of impulses and in the total time which impulses are being generated, provided that the autocorrelogram of the multiple impulses has a high central lobe compared to the magnitude of any side lobes.

Figure 3:
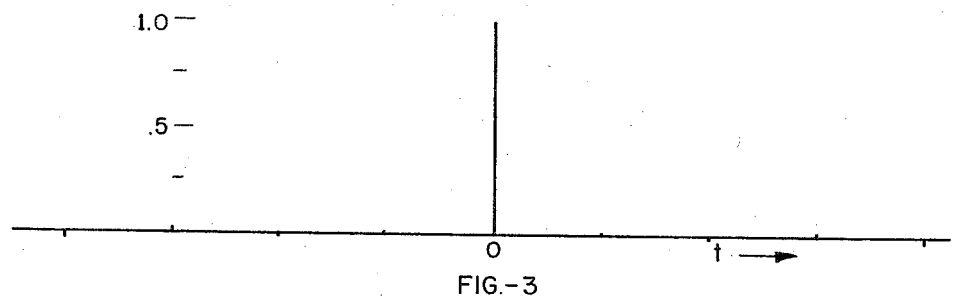
FIGURE 3 represents the autocorrelation function resulting from the pattern of impulses shown in FIGURE 2.
Figure 2:
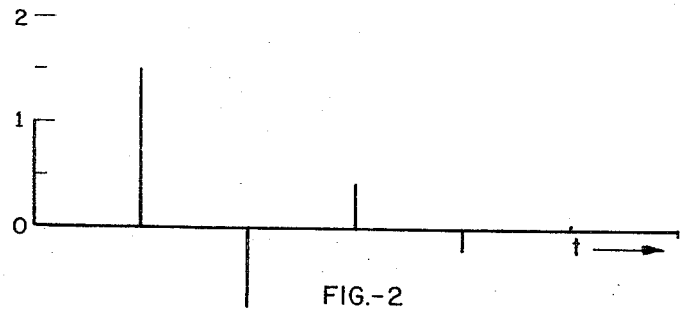
FIGURE 2 is a corresponding time graph in which, theoretically, a pattern or series of impulses have been applied to the earth using discrete impulses, both positive and negative.

For example, in FIGURE 2 I have shown a pattern of positive and negative impulses which greatly improve signal-to-noise ratio when this pattern is crosscorrelated with the corresponding received seismic trace. In this case, a relatively simple pattern, I chose to have the impulses occurring at equal times through the pattern, though this is not a necessary requirement. For simplicity in discussion, the initial amplitude is given the value 1.0. Succeeding amplitudes of the impulses are $+1.5$, $-.75$, $+.375$, $-.188$, and $+.09$. The autocorrelation function (as described by Equation 3) for this particular impulse pattern is shown graphically in FIGURE 3. The main and side lobes are separated by the same time as the time intervals of impulses in FIGURE 2. (It is characteristic of autocorrelation functions that they are symmetrical about the center lobe.)

Here, if the amplitude of the center lobe be given the arbitrary value 1.0, the amplitudes of the next four side lobes in order are: $+.006$, $-.012$, $+.024$, $-.048$. The succeeding lobes are of lesser amplitude. Accordingly, when the impulse pattern of FIGURE 2 is correlated with the reflected waves on the field record obtained when the earth was excited in accordance with FIGURE 2 at a localized zone, it has minimal false correlation waves since all side lobes have been shown to be of unimportant amplitude. In practice, it is found that a ratio of maximum lobe to side lobe amplitude on the autocorrelogram of the implied impulse pattern should be at least 10 to 1 and, preferably, at least 20 to 1.

Figure 5:
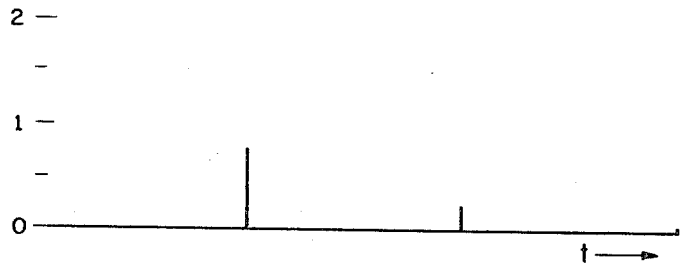
FIGURE 5 shows a corresponding time graph of the negative impulses shown in FIGURE 2, but plotted in the opposite sense.
Figure 4:
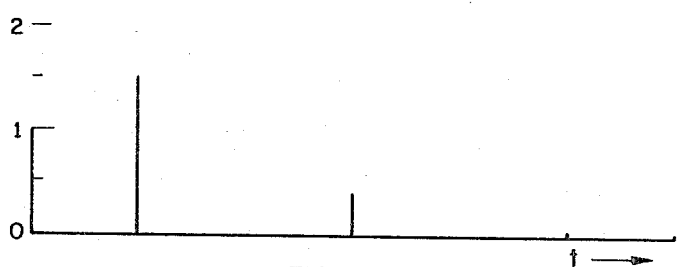
FIGURE 4 shows a pattern of impulses directly proportional in amplitude and time to the positive part of the impulses shown in FIGURE 2.

It has already been explained that, theoretically, one should apply the impulse pattern of FIGURE 2 to a localized zone of the earth, for example at a particular point on, slightly beneath, or slightly above the surface, and crosscorrelate the applied impulse pattern with the received seismic waves generated in response of the application of this impulse pattern to the earth. However, the reproduction of negative amplitude impulses of any pronounced magnitude is somewhat difficult and cumbersome so that I prefer to split up the original impulse pattern which satisfies the autocorrelation criterion into two parts: that part containing only positive impulses, and that part containing only negative impulses. This is shown graphically in FIGURES 4 and 5. In FIGURE 4 are shown the same positive impulses as appear in FIGURE 2, but no negative impulses. In FIGURE 5 there is shown in proper amplitude and timing with respect to the original pattern in FIGURE 2, the negative amplitude impulses of FIGURE 2, though in this case these have been plotted with amplitude extending upward. As discussed above, the prefered application scheme involves applying to the localized zone of the earth the plurality of impulses directly proportional in time and in amplitude to, say, the impulse pattern in FIGURE 4. The resulting seismic waves at one or more reception points are converted into electrical signals by a geophone or geophones, amplified in the conventional manner, and reproducibly recorded, for example, on magnetic tape as a function of time. Since such recording is very well-known in the art, there is obviously no need to describe this in detail. One then repeats this same process using for the impulse pattern applied to the earth this time, the impulses from the pattern shown in FIGURE 5. Obviously, the resultant reproducible record in this case contains the negative of the desired received waves, since all applied impulses have been positive. It is simply necessary when using this record in the remaining step of the process, to reverse its amplitude relative to the reproducible record obtained when applying the impulse pattern of FIGURE 4.

If the signals on the two reproducible records be designated $f_6(t)$ and $f_7(t)$, one way of carrying out the final desired crosscorrelation step is to reproduce $f_6(t)$ and $f_7(t)$ simultaneously and at the same time scale, and crosscorrelate the impulse pattern shown on FIGURE 2 with $[f_6(t)-f_7(t)]$. An exact mathematical equivalent is to crosscorrelate the impulse pattern with $f_6(t)$, then separately crosscorrelate this same impulse pattern with $f_7(t)$, and subtract one of these crosscorrelation functions from the other. It is apparent that in carrying out the crosscorrelation one must use the same time scale for each function which is to be crosscorrelated.

It is also apparent that in carrying out this system one may, if desired, apply filtering to the received seismic waves, either before they are reproducibly recorded, or afterward, if desired. Another variation which can be carried out is that the crosscorrelation need not necessarily be carried out with the impulse pattern itself. Instead of this impulse pattern one can set up a geophone adjacent the localized zone of the earth where the plurality of impulses is to be applied and reproducibly record the response of the earth at this point to the applied plurality of impulses. This recorded signal is reproducibly recorded. It consists of two parts—the earth response to the positive impulses of the pattern, and the response to the positive impulses representing the negative impulses of the pattern. The two records are simultaneously played back and a reproducible record made of the difference in the two responses. This can be crosscorrelated with the received seismic waves $[f_6(t)$ and $f_7(t)]$ if desired. Again, one may simply set up an artificial pattern consisting of a plurality of rapidly decaying transients or impulses applied at the desired times and of amplitudes satisfying the autocorrelation criterion already described, and use this artificial pattern in the crosscorrelation step. It is to be understood, therefore, that where reference is made to crosscorrelation with the impulse pattern, this impulse pattern should be considered to include the artificial pattern, and the recorded response to the two parts of the impulse pattern, suitably phased, as described above.

A number of different types of apparatus may be employed to apply the desired plurality of impulses to the earth at a localized zone. As used in this connection "localized zone" refers to any place located within the order of 100 to 200 feet in any direction from the theoretical shot point. One advantageous arrangement is shown diagrammatically in FIGURE 6. One may lay out at or near the surface of the earth 16, a plurality of lengths of detonating cord or linear explosive (a well-known example being that sold under the trade name Primacord by the Ensign-Bickford Company), each such length being directly proportional to the amplitude of one of the impulses in the pattern shown in FIGURE 4. (Obviously, an equivalent arrangement will also be used for the impulse pattern shown in FIGURE 5.) Each such length 17 of detonating cord is mechanically connected to an electrical detonating cap 18 and, in turn, to a commutating timer which applies selectively an electrical detonating pulse at the proper time to each of the various lengths of cord. Detonation velocity along the length of such a cord is sufficiently high so that ordinarily detonation can be considered to take place substantially instantaneously.

The timing arrangement must detonate these lengths of detonating cord at times directly proportional to the time intervals shown in FIGURE 4. This arrangement is shown diagrammatically in FIGURE 6. One side of a source of electrical energy 19 is connected through actuating and safety switch 20 to one side of each of the caps 18 and preferably to a trace of the multitrace recorder 21. The other side is connected to the brush of a rotating commutator 22 around the circumference of which is a plurality of brushes 23. A single commutator bar 24 makes connection with the brush at the center and, in turn, with each brush on the circumference of the commutator as this commutator is rotated, preferably by an electric motor or other rotating source (not shown). Each brush 23 is connected through a switch 25 to another line of the detonating cable and thence to one of the caps 18. A separate brush 26 (called the zero-reference brush) is connected to the other side of the trace in the recorder 21, to give a timing trace.

After switch 20 is closed, the time interval after an electric signal appears on brush 26 until energy is applied to any brush 23 depends upon the arcuate location of the brush and the speed of the commutator 22. Accordingly, by adjusting the location of a brush 23 and/or by adjustment of the rotational speed of the commutator 22, it is possible with this system to detonate selectively the various lengths of detonating cord 17 at times directly proportional to the corresponding times in the impulse patterns of one of FIGURES 4 and 5. That shown in FIGURE 6, for example, corresponds to that shown in FIGURE 5. A timing pip will appear on the magnetic tape recording in recorder 21 at zero time, which enables the proper time correspondence of the field records when crosscorrelation is to be carried out subsequently.

One or a plurality of geophones 27 has been placed at or near the surface of the ground 16 and at desired distances from the localized zone where the detonating cords were placed. Such geophone or geophones are symbolically shown connected through amplifying apparatus 28 to one or more traces of the reproducible recorder 21. Here, again, this procedure for recording received seismic waves is conventional in this art and no detailed description is considered necessary.

In operation, after the detonating cords have been capped and (preferably) tamped in place (sufficiently far apart to avoid sympathetic detonation between adjacent cords, but within the localized zone as above defined) and the recording apparatus is ready, switch 20 is closed as the commutator bar 24 is approaching brush 26. Commutator 22 then automatically detonates one by one the explosive in the various detonating cords and produces in the earth an impulse pattern substantially directly proportional in time and amplitude to the desired impulse pattern, in this case the one shown in FIGURE 5. When the resultant seismic waves impinging on the geophone or geophones 27 have substantially died out, conventionally in about 5 to 10 seconds after the last detonating cord has been exploded, the magnetic tape record obtained in recorder 21 (sometimes herein called a field tape) is ready for the crosscorrelation process already described.

Figure 6:
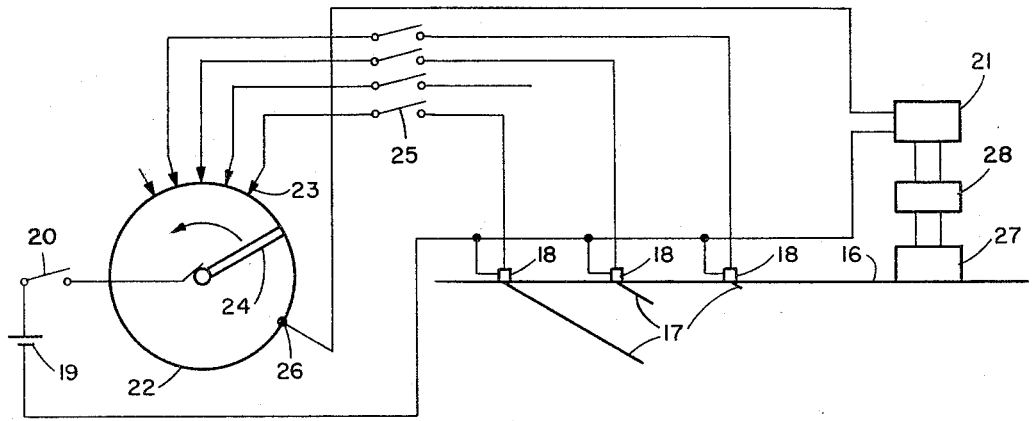
FIGURE 6 shows one illustrative embodiment of apparatus for initiating a plurality of discrete impulses and applying seismic energy to the ground proportional to the amplitude-time pattern of either FIGURE 4 or FIGURE 5.

Instead of using lengths of detonating cord, it is possible to drill a plurality of shot holes in the localized zone, one for each charge to be detonated. These would ordinarily be drilled to the bottom of the weathered zone. In each is placed a weight of explosive substantially directly proportional to the amplitude of one of the impulses on the impulse pattern of either FIGURE 4 or FIGURE 5, as the case may be, and capped and detonated as shown in FIGURE 6. However, it must be pointed out that as long as the relative weight of explosive is employed as the criterion for establishing the proportionality to impulse peak amplitude, the maximum weight of explosive used should be considerably less than that ordinarily employed in normal geophysical field operations. This is due to the fact that a lower amount of high frequency components is found as explosive weight is increased. Preferably one limits the maximum weight of explosive detonated to the order of $\frac{1}{8}$ to $\frac{1}{4}$ of a pound of dynamite, or equivalent.

In some cases, insufficient energy is imparted to the earth to get the desired seismic response at the geophone or geophone 27, using the technique discussed above. In this case, it is possible to improve the results by carrying out precisely the same procedure repeatedly, that is, using fresh charges of explosive each time, and making a plurality of field records on recorder 21. These field records may then be played back or reproduced electrically and synchronously in time, and the amplitude of the various corresponding traces added electrically, and reproducibly recorded. By this means a resultant amplitude of seismic response is built up which is many times that due to one individual impulse pattern. This technique is also well-known in the seismic recording art. Generally this type of procedure has been carried out in the "weight-drop" system of seismic prospecting. One description is in U.S. Patent 2,851,121, McCollum.

Another means of applying a pattern of impulses proportional in time and amplitude to FIGURES 4 and 5, is to use an electrical or mechanical transducer or vibrator. Such units are now employed for initiating seismic waves in geophysical prospecting over a period of several seconds. Basically the electrical version of such a vibrator consists of a massive plate which sets on the ground and carries a spring-loaded inertia mass coupled electromagnetically to a drive system. When electric current is fed to the drive, a force on the plate, and hence on the earth, is generated substantially directly proportional to the electric current. The mechanical system uses a hydraulic servo mechanism responsive to an electric pilot valve for accomplishing the same function. Such vibrators can be empoyed in my invention if the pilot electric current actuating the vibrator varies with time essentially in accordance wth the impulse pattern of positive or of negative impulses as shown in FIGURES 4 and 5.

Extensive marine geophysical seismic surveys are being carried out. In this case, a different form of actuator is desirable to produce the impulse pattern. One such system is shown diagrammatically in FIGURE 7. Essentially this system uses what is known as a gas-gun (see for example, description of such apparatus in Geophysics, vol. 24, No. 4, October 1959, pp. 750–755). A diagrammatic cross-section through such a gun is shown by reference numeral 30 in FIGURE 7. It may consist, for example, of a 4" to 6" diameter metal pipe form 6' to 15' long, the top end of which is capped and the bottom end of which extends into the water and is preferably covered by a thin elastic membrane. Near the lower end of this chamber is a valve 31 which provides a continual but variable leak from the gas-gun. The valve, in turn, communicates with a discharge pipe 32 and a check valve 33.

Into the chamber near the top is introduced a mixture of an oxygen-containing gas and a combustible gas, the mixture being explosive. Thus, for example in FIGURE 7 a conventional high pressure oxygen tank 34 and a propane tank 35 furnished with pressure regulating valves 36 and 37, respectively, are connected through lines 38 and 39 containing proportioning valves 40 and 41 to the gas-gun 30. Until actuation of the spark plug 42 located near the entrance of the gas mixture, gas flows through the gun and is purged through valve 31. The amount of mixture present in the gun is controlled by valve 31 through a suitable mechanism such as a cam drive 43. The spark plug 42 is fired by a suitable high voltage source 44 through a rapid actuating switch or relay 45 which in turn is controlled by a timing apparatus 46.

In use, the gas-gun is towed back of the shooting boat in an otherwise conventional geophysical marine seismic survey, for example, of the sort described in the Geophysics article referred to. The timer 46 is arranged to actuate the switch 45 and to detonate the explosive mixture in the gas-gun in direct proportion to the times of application of the impulse pattern, such as that of FIGURE 4 or FIGURE 5. In one cycle of operation, the valve 31 is adjusted so that the first detonation produces an impulse in direct proportion to the peak amplitude of the first impulse of the pattern. Then the adjustable mechanism 43 acts both to purge the firing chamber of the gas-gun and introduce a charge capable of producing an amplitude of explosion in accordance with the second peak of the impulses in the pattern, and so on. The string of seismometers in the water responds therefore to the pattern of the impulses of the type, say, of FIGURE 4, and a suitable magnetic tape reproducible record is made of the output of the various geophones. The timing system is then reset and the second pattern shot in accordance with the impulse pattern of, say, FIGURE 5. The rest of the procedure is as is already described.

If desired, the duty cycle of an individual gas-gun can be decreased by arranging to have a multiplicity of gas-guns. For example, if three gas-guns are employed, each need be charged for only ⅓ of the total impulses in the pattern to be fired, and the associated timing mechanism is arranged to fire that particular gun in the appropriate sequence. This corresponds roughly with the timing and commutation used in a conventional multicylinder automotive engine except that the valve 31 (the equivalent of the throttle in the automotive engine) must necessarily operate considerably more rapidly than in an ordinary engine.

Figure 7:
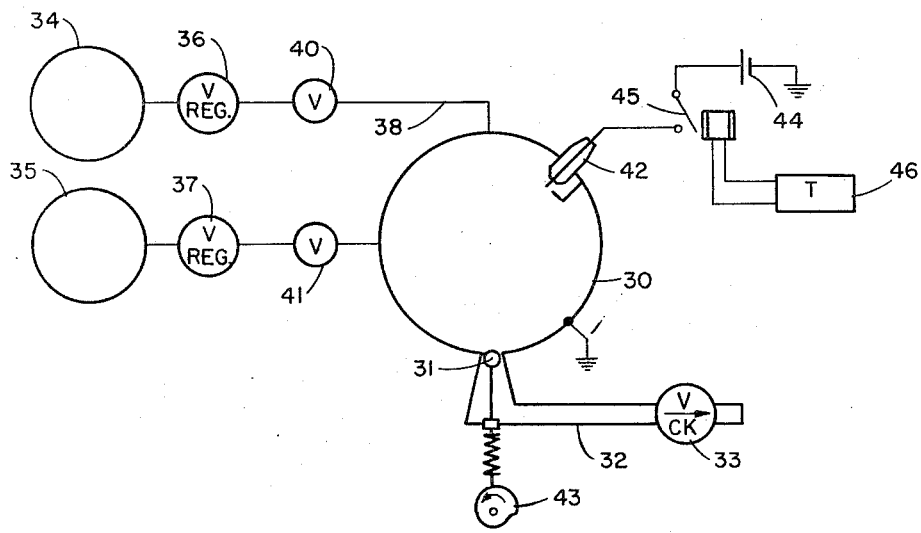
FIGURES 7 and 8 illustrate a second form of apparatus, the function of which is substantially identical to that of FIGURE 6.
Figure 8:
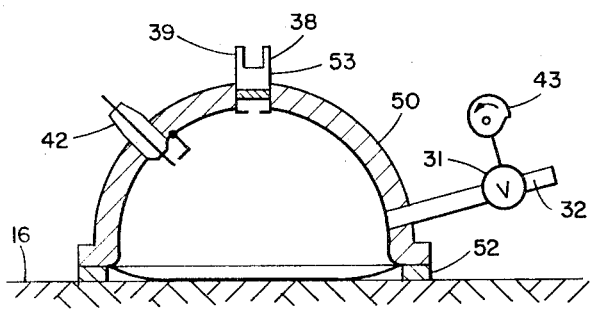

A modification of this gas-gun, suitable for use either on land or water, is shown in diagrammatic section in FIGURE 8. Here a heavy hemispherical shell 50 is provided with a thin flexible diaphragm 51 of rubber, thin sheet steel, or the like. The diaphragm is clamped to the shell by means of a ring 52 attached, for example, with a ring of bolts (not shown). This furnishes an approximately hemispherical firing chamber provided with an inlet 53 or mixing chamber connected through lines 38 and 39 to the oxygen-containing gas source and the oxidizable gas. The spark plug 42 is attached to the shell 50. The valve 31 with its cam drive 43 serves the same throttling and purging functions as the embodiment shown in FIGURE 7. The rest of the apparatus used in this embodiment is the same as that used in FIGURE 7.

In operation, the hemispherical firing chamber is placed on the surface of the earth 16 with the diaphragm 51 in contact with it and a series of impulses applied as already discussed in connection with FIGURE 7. If the apparatus is used in a water survey, the diaphragm is immersed in the water.

It is apparent that a number of other embodiments of the seismic initiating system could be employed. In all cases, the seismic source is used to produce first a pattern of impulses in accordance with the amplitude and time application of the set of either the positive or the negative impulses chosen from the plurality of impulses forming a pattern having an autocorrelation function containing a maximum lobe at least 10 times the amplitude and, preferably, 20 times the amplitude in a side lobe. A second set of seismic impulses is later applied in the same zone in accordance with the other set of positive or negative impulses in the pattern. The difference between the reproducible records obtained from the response of the geophones to the two sets of such seismic waves are cross-correlated with the original pattern, using the same time scale for the pattern and the resultant received waves. This produces a final seismic record which can, in visual form, aid the geophysicists in determining the depth and dip of subsurface formations with an improved ratio of signal-to-noise.

I claim:
1. A method of seismic prospecting in which the autocorrelation function of a plurality of discrete impulses of increasing time of application and generally of decreasing peak amplitude has been determined, said time of application and peak amplitude of said impulses having been varied until the maximum lobe of said function is at least 10 times the amplitude of any side lobe of said function, whereby an impulse pattern of positive and negative impulses is established, comprising:
   (1) applying to the earth at a localized zone a plurality of compressional impulses directly proportional in time of application and in peak amplitude to the corresponding characteristics of one only of said positive and said negative impulse pattern,
   (2) receiving the seismic waves resulting from step (1) at least near the surface of the earth and reproducibly recording said waves,
   (3) applying to said zone a plurality of compressional impulses directly proportional in time of application and in peak amplitude to the corresponding characteristics of the other of said positive and said negative impulse pattern, the proportionality factors being substantially identical to those of step (1),
   (4) receiving the seismic waves resulting from step (3) at least near the surface of the earth and reproducibly recording said waves, and
   (5) producing a visible indication showing the difference between the cross-correlation of said pattern of positive and negative impulses with the waves recorded in steps (2) and (4), using the same time scale for said pattern and for said waves.

2. A method in accordance with claim 1 in which the total time duration of the application of said impulse pattern applied to the earth is from approximately 2 to approximately 6 seconds.

3. A method in accordance with claim 2 in which the maximum lobe of said autocorrelation function is at least 20 times the amplitude of any side lobe of said function.

4. A method of seismic prospecting comprising:
   (1) determining the autocorrelation function of a plurality of discrete impulses of increasing time of application and generally of decreasing peak amplitude, and varying time of application and peak amplitude of said impulses until the maximum lobe of said function is at least 10 times the amplitude of any side lobe of said function, whereby an impulse pattern of positive and negative impulses is established,
   (2) applying to the earth at a localized zone a plurality of compressional impulses directly proportional in time of application and in peak amplitude to the corresponding characteristics of one only of said positive and said negative impulses in said pattern,
   (3) receiving the seismic waves resulting from step (2) at least near the surface of the earth and reproducibly recording said waves,
   (4) applying to said zone a plurality of compressional impulses directly proportional in time of application and in peak amplitude to the corresponding characteristics of the other of said positive and said negative impulses in said pattern, the proportionality factors being substantially identical to those of step (2), (5) receiving the seismic waves resulting from step (4) at least near the surface of the earth and reproducibly recording said waves, and (6) carrying out one of the following two alternative steps:
(a) crosscorrelating the difference in amplitude between the waves recorded in steps (3) and (5) with said impulse pattern of said positive and of said negative impulses from step (1), using the same time scale for both functions;
(b) crosscorrelating the waves recorded in step (3) and those recorded in step (5) separately and respectively with said impulse pattern of said positive and of said negative impulses from step (1), using the same time scale for each function, and subtracting one crosscorrelation output from the other crosscorrelation output.

References Cited

UNITED STATES PATENTS

| | | | |
|---|---|---|---|
| 2,320,248 | 5/1943 | Shimek | 181—0.5 |
| 2,779,428 | 1/1957 | Silverman | 181—0.5 |
| 2,808,577 | 10/1957 | Crawford et al. | 181—0.5 X |
| 3,096,846 | 7/1963 | Savit et al. | 181—0.5 |
| 3,108,249 | 10/1963 | Clement | 340—15.5 |
| 3,264,606 | 8/1966 | Crook et al. | 181—0.5 X |

SAMUEL FEINBERG, *Primary Examiner.*

BENJAMIN A. BORCHELT, *Examiner.*

M. F. HUBLER, *Assistant Examiner.*